UNITED STATES PATENT OFFICE.

JAN SZCZEPANIK, OF LUISENHOF, NEAR DRESDEN, GERMANY.

PROCESS FOR PRODUCING POLYCHROMATIC SCREENS, PLATES, FILMS, AND PAPER FOR COLOR PHOTOGRAPHY.

1,089,602. Specification of Letters Patent. Patented Mar. 10, 1914.

No Drawing. Application filed August 6, 1908. Serial No. 447,336.

*To all whom it may concern:*

Be it known that I, JAN SZCZEPANIK, engineer, subject of the Austro-Hungarian Emperor, residing at Weisser Hirsch, Luisenhof, near Dresden, in Germany, have invented new and useful Improvements in Processes for Producing Polychromatic Screens, Plates, Films, and Paper for Color Photography, of which the following is a specification.

The present invention relates to a method of producing polychromatic screens, and especially three-color screens, for the production of photographs in natural colors.

This invention further relates to the making of photographic plates, films, and paper for color photography.

The said method is based on the known property possessed by various dyestuffs, of behaving differentially or selectively toward other substances to be stained therewith. Thus, for instance, a dry collodion film is at once stained blue on being dipped in an aqueous solution of basic methylene blue containing a little alcohol, whereas it stains with difficulty on being dipped in an even purely alcoholic solution of acid erythrosin. On the other hand a dry gelatin film which is difficult to stain by immersion in even a purely aqueous solution of methylene blue, acquires a stain at once when dipped in an alcoholic solution of erythrosin containing only a little water. If the two dyestuff solutions be mixed, and a film of gelatin and one of collodion be dipped simultaneously in the mixture, the dyestuffs separate, the collodion taking a pure blue stain while the gelatin is stained pure red. If a solution of gelatin that has been stained with methylene blue, and treated with a little alcohol for the purpose of softening the collodion, be applied to dry collodion film, the methylene blue migrates from the gelatin into the collodion. Conversely, erythrosin will migrate almost completely from a collodion solution stained therewith into a gelatin support. This differential behavior of the acid and basic dyestuffs toward certain substances, such as gelatin, collodion, lacs, gums, resins, caoutchouc and many others, is, according to the present method, utilized for the production of three-color or polychrome screens in the following manner, namely that the support intended to receive the screen, and consisting, as already known, of a film of gelatin, collodion or the like, or carrying such a film, is brought into contact with the desired dyestuffs, which are mixed with substances for which these dyestuffs have a less powerful affinity than they have for the said film of collodion or gelatin. The dyestuffs then migrate from their carriers into the gelatin or collodion film, and after the said dyestuff carriers have been removed, as for instance by washing, the polychromatic, *e. g.* three-color, screen is left in a finished state.

The practical manufacture of the screens is carried out in the following manner: Three solutions of gelatin are prepared, and each of them is stained with a dyestuff possessing a stronger affinity for collodion than it has for the vehicle, *e. g.* gelatin. The stained solutions are then evaporated to dryness and ground to fine powder. The three powders are mixed and applied to a freshly prepared and therefore still rather sticky collodionized support, either by sifting them through sieves on to the support traveling underneath, or else by means of a dusting-on device. The dyestuffs migrate from the powder into the collodionized surface and then the powder, now colorless, is removed by washing. Although in this method, the colored powders overlie each other to a large extent, no interchange of their dyestuffs occurs but on the other hand uncolored patches may remain in many parts of the support, owing to no color having been absorbed through defective contact between the powder and the substratum. This defect, however, may be remedied, as for example by dusting-on only two differently colored powders, and producing the thrid color by treating the support in a bath containing the third dyestuff dissolved in a substance of such kind (*e. g.* gelatin) that the dyestuff will migrate from it into the collodion, the gelatin being then removed by washing. Or, again, three differently colored powders may be dusted on, a smaller quantity being taken of one than of the others, and the treatment then completed as above.

Instead of gelatin, a solution of gum arabic, for example, may be used for absorbing the dyestuffs, since for this substance, also, the dyestuffs have a lower affinity than they have for collodion. If, on the other hand, the support be coated with a film of gelatin instead of being collodionized, the reverse method is adopted, that is to say the dyestuffs are dissolved in collodion, dried and dusted on the support. In this case of course, the dyestuffs dissolved in the collodion must be such as exhibit a greater affinity for gelatin and will therefore migrate from the colored collodion powder into the gelatin film.

Instead of dusting the support over with colored powders, it may be sprayed directly with the colored liquids, for instance with the above-named three colored gelatin solutions or the like, simultaneously or in succession. In this case the following procedure may be adopted as an example: A collodionized support is sprayed first with, for instance, a red colored solution of caoutchouc (in chloroform), then with a blue-colored solution of gelatin, and the plate finally bathed in a solution of the third dyestuff (yellow-green). The dyestuff migrates from the solutions of caoutchouc and gelatin into the collodion, and the caoutchouc and gelatin are removed by washing, whereupon the support appears stained with the three colors. The third color is not necessarily applied by bathing in a solution of the dyestuff, but may also be applied by spraying. By using dyestuff solutions that will not mix together, they may all be applied at the same time by means of two or three spraying devices as the case may be.

Another typical method consists in first covering a collodionized support, such for instance as film, glass, paper, etc., with figures (dots for example) by any process, e. g. by printing with colorless gelatin, this operation being performed in such a manner that the coated surface occupies one half of total superficial area of the screen. Then regular figures (dots again for example) are applied crosswise, so as to cover only one-third of the surface of the screen, by means, for example, of a yellow-green varnish color. Provided the figures or dots have been distributed with geometric uniformity, the two groups of figures or dots will overlap each other to an extent equal to one-sixth of the area of the screen. A collodion film prepared in this way, is, for instance, bathed for a short time in the above cited mixture consisting of a solution of methylene blue and erythrosin. Since the fatty yellowish-green color will not absorb any of the dyestuff solutions, only the parts left uncovered by the fatty color, and consisting, one half of collodion and the other half of gelatin, will be stained. Since the gelatin is stained red and the collodion blue in such a mixture of dyestuffs, it is clear that a three-color screen, free from imperfections of covering can be obtained by this means. Of course, separate baths of erythrosin and methylene blue, or similar dyestuffs, may be used instead of the mixed bath. Again, the fatty color may be applied first and a gelatin solution stained (red) with rhodamin may be applied over and partly covering it. In this case the red rhodamin migrates from the gelatin into the collodion, but it is not absorbed by the fatty color. The free collodion is then stained by bathing in a solution of methylene blue or similar dyestuff, which is not absorbed either by the fatty color (which will not take up any dyestuff at all) or by the gelatin. Both the stained gelatin over the parts in contact with the fatty color and the gelatin from which the rhodamin has been absorbed by the underlying collodion, are then removed by a short bathing in luke-warm water, leaving a completed three-color mosaic free from any imperfections of covering.

Another method of carrying out this process consists in the following:—Three filaments stained with different primary colors are prepared from stained solutions of gelatin or the like, and are made into a tissue of fabric; or three powders made from differently colored gelatin are mixed together and pressed to form a block; or thin leaves of gelatin stained with different colors are laid alternately one upon another until a block of a certain thickness is obtained, this being then divided into two parts by a vertical cut. The fabric, or compressed or divided block, is used as a printing block, by being applied for a short time to the collodionized surface of the support, whereupon the adjacent and uniformly distributed dyestuffs in these blocks migrate into the collodion. These printing blocks may be used for the same purpose more than once, while any traces of gelatin adhering to the support after the impression may be removed by washing. If the support be gelatinized, then the printing must be made of stained collodion, the dyestuffs used in this event being such as will migrate into gelatin.

In order, for optical reasons, to dispense with an insulating layer between the three-color screen and the panchromatic emulsion, the screen stratum, on the surface of which the patches of color are carried, must consist of some material other than that of the panchromatic stratum. If the panchromatic stratum be a gelatin-silver-bromid emulsion, the screen support must be made of collodion or caoutchouc for instance; but if the panchromatic stratum consist of collodion or similar substances, then the support carrying the screen must no longer be of collodion but of some material such as gelatin.

For the production of photographic pictures in colors, with the aid of the three-color screen, on opaque supports, such as paper for instance, the support is first of all rendered transparent by means of oils, fats, or the like, and is then provided with a transparent layer of collodion, gelatin, caoutchouc or the like, suitable for carrying the three-color screen, on which layer a three-color mosaic is produced by the means already described, and to which layer a panchromatic stratum is applied. After exposure through the transparent support, and after the negative or positive silver image is finished, the substances (oils, fats or the like) used for rendering the support transparent are removed by a bath of suitable material such as ether, benzin, chloroform, alcohol, etc., whereby the original opaque appearance of the support, e. g., paper, is restored. The substances used for making the paper transparent may be suitably colored, for instance orange or yellow, in order (since the exposure must be made through the support) to replace the usual yellow filter necessary for the correction of the still imperfectly panchromatic strata used, the said color being removed after the paper has been washed free from the oil, or like matter.

Instead of providing the three-color screen with a panchromatic silver-bromid emulsion, which has to be developed after exposure, it is advisable for copying purposes, to provide it with a printing-out emulsion, as for example a silver-chlorid emulsion, that has been rendered panchromatic by suitable sensitizers, thus affording the operator an opportunity of watching the progress of the copying, in a weak light.

I claim:

1. The method of producing polychromatic screens for color photography, comprising simultaneously applying to a support a number of dyes contained in vehicles comprising material for which said dyes have a lower affinity than for the support so that said dyes will migrate into the support from the vehicles, and then removing the vehicles from the support by washing.

2. The method of producing polychromatic screens for color photography, comprising applying to a support discrete dye-containing vehicles comprising material for which said dyes have a lower affinity than for the support so that said dyes will migrate into said support from the vehicles, and then removing the vehicles from the support by washing.

3. The method of producing polychromatic screens for color photography, comprising projecting upon a support discrete dye-containing vehicles comprising material for which said dyes have a lower affinity than for the support so that said dyes will migrate into said support from the vehicles, and then removing the vehicles from the support by washing.

4. The method of producing polychromatic screens for color photography, comprising applying to a support a mixture of dye powders, the dyes being contained in vehicles comprising material for which said dyes have a lower affinity than for the support so that said dyes will migrate into said support from the vehicles, and then removing the vehicles from the support by washing.

5. The process of manufacturing polychromatic screens for color photography in natural colors, which comprises bringing into close contact with a suitable support, a sufficient number of provisional dye-stuff carriers, such carriers being provided with dyes having a lower affinity for the carriers than for the support so that said dyes will migrate into the support from the provisional carriers, and then removing the provisional carriers.

6. The process of making polychromatic media, such as plates, films, and paper, for color photography in natural colors, comprising applying to a base a support having an affinity for coloring matter, applying coloring matter to said support by migration, and then covering said colored support by a light-sensitive agent carried in a vehicle having a different affinity for said coloring matter than said support.

In testimony whereof I have signed my name to this specification in the presence of two subscribing witnesses.

JAN SZCZEPANIK.

Witnesses:
ULYSSES J. BYWATER,
PAUL ARRAS.